Figure 1:
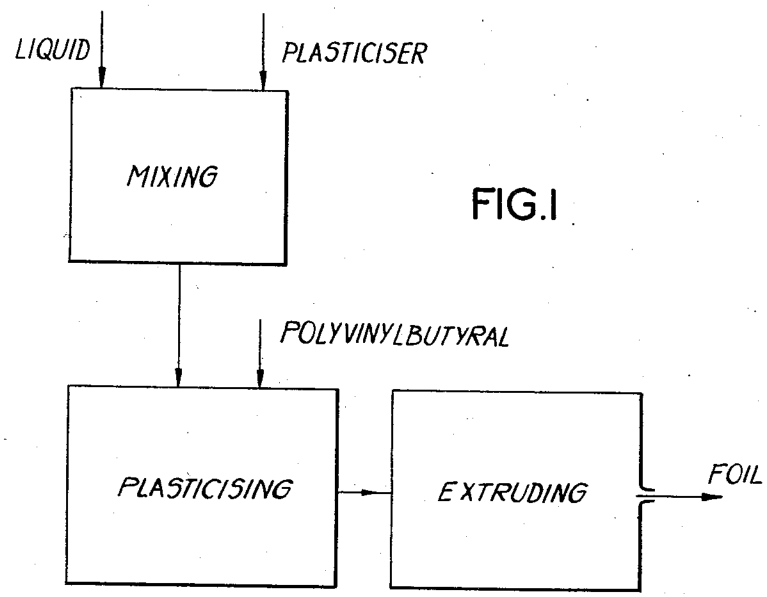

Oct. 27, 1959 W. JENSCH 2,909,810

PROCESS FOR THE PRODUCTION OF POLYVINYLBUTYRAL FOILS

Filed Dec. 4, 1957

United States Patent Office 2,909,810

Patented Oct. 27, 1959

2,909,810

PROCESS FOR THE PRODUCTION OF POLYVINYLBUTYRAL FOILS

Wolfgang Jensch, Troisdorf, near Koln, Germany, assignor to Dynamit-Actien-Gesellschaft vormals Alfred Nobel & Co., Troisdorf, near Koln, Germany, a German company Application December 4, 1957, Serial No. 700,636

Claims priority, application Germany February 28, 1957

4 Claims. (Cl. 18—57)

This invention relates to a process for the production of extruded polyvinylbutyral foils for use in the manufacture of laminated safety glass. Such foils must have a high content of plasticiser whilst containing no fillers, and are therefore very soft even when in the cold state and hence have little resistance to distortion. For the successful employment of the foils in the manufacture of laminated safety glass the surfaces of the foils must be initially rough, although such roughness disappears when the foils are pressed during the laminating process. The necessary surface roughening of the extruded foils is difficult to effect because of the soft nature of the foils which precludes mechanical stressing and heating. One known method of effecting the roughening is to spray the extruded foil with plasticiser-free solutions of polyvinylbutyral, but this leads to an undesired increase in the cost of the foils.

It is an object of the invention to devise a process for the production of the extruded foils such that the necessary surface roughening can be easily achieved.

In accordance with the invention there is provided a process for the production of extruded polyvinylbutyral foils for use in the manufacture of safety glass, wherein liquid is added to the polyvinylbutyral composition before the introduction thereof into the extruder, the boiling point of the liquid being below the temperature at which the extruded material leaves the extruder.

The liquid advantageously consists of water to minimise the cost of the process, and the added quantity of liquid is of the order of 3–15% by weight calculated on the polyvinylbutyral employed.

In addition to the roughening effect, the addition of liquid, more especially water, in the extrusion of polyvinylbutyral foils affords further advantages. Even if a satisfactory homogeneous plasticisation has been effected, the foils still contain in many cases a relatively considerable number of incompletely disintegrated polyvinylbutyral nodules. These polyvinylbutyral nodules are sometimes still visible after the pressing of the foils to form laminated glass, so that the glass has not the required complete optical clarity. An increase in the temperature at which the foils are produced, accompanied by intensified mechanical working in the plasticisation of the initial materials, often affords no substantial improvement. On the other hand, if small quantities of the said liquid, more especially water, are added to the initial materials, a nodule-free foil can be obtained in addition to the roughening effect. A further important fact regarding the manufacture of polyvinylbutyral foils by the extrusion method is that the addition of even small quantities of water greatly reduces the viscosity of the plasticised product. The possibility of degradation of the molecule chains in the extruding process is thereby reduced, and foils having better mechanical properties and a less yellowish colour tone are obtained, which is extremely important for their application in the manufacture of safety laminated glass. Owing to the greatly reduced viscosity of the plasticised product, steadier operation of the extruder is ensured, whereby foils having greater accuracy of wall thickness can be produced. Moreover, the output capacity of the extruder can be substantially increased for the same reason. The possibility of increasing the output capacity of the extruder arises also out of the fact that the pre-plasticisation in the plasticising extruder disposed on the input side of the shaping extruder can take place at substantially reduced temperatures owing to the addition of liquid, whereby the plasticised product obtained cakes less strongly in the charging duct of the shaping extruder and is more rapidly taken up by the latter.

Figure 2:
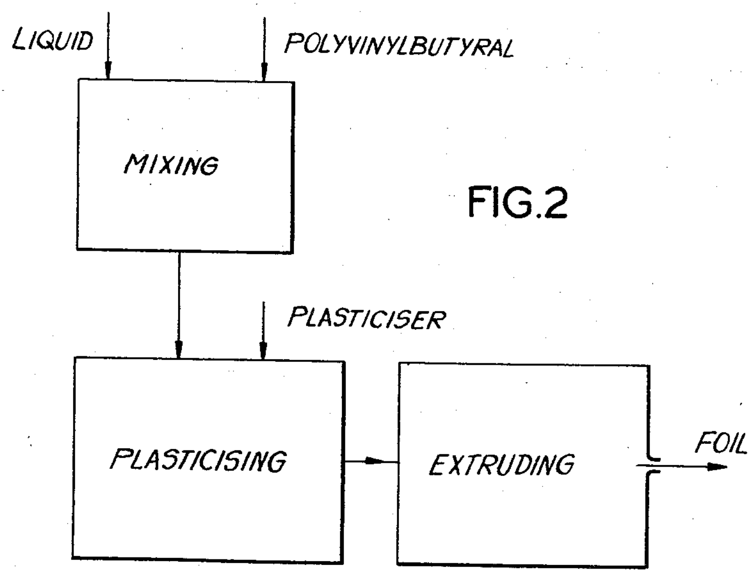

In order to illustrate the invention, several examples will now be described with reference to the accompanying drawings, in which Figures 1 and 2 are flow diagrams.

*Example 1.*—4.5 parts by weight of water are emulsified with the quantity of plasticiser necessary for producing 100 parts of a plasticised product consisting of plasticiser and polyvinylbutyral, and the emulsion is employed to plasticise polyvinylbutyral. The plasticised product thus obtained gives, on further working up in the extruder above 120° C., a polyvinylbutyral foil which is already surface-roughened and nodule-free when it leaves the extruder nozzle. Figure 1 is a flow diagram corresponding to this example.

*Example 2.*—4.5 parts by weight of water are homogeneously distributed in the quantity of polyvinylbutyral necessary for producing 100 parts of a plasticised product consisting of plasticiser and polyvinylbutyral, and the mechanical mixture is plasticised with plasticiser. The further working up of the plasticised product takes place as in Example 1. Figure 2 is a flow diagram corresponding to this example.

*Example 3.*—6 parts by weight of ethylpropionate are dissolved in the quantity of plasticiser necessary for producing 100 parts of a plasticised product consisting of plasticiser and polyvinylbutyral, and the solution is employed to plasticise polyvinylbutyral. The further working up of the plasticised product takes place as in Example 1. Figure 1 is a flow diagram corresponding to this example.

*Example 4.*—6 parts by weight of iso-octane are dissolved in the quantity of plasticiser necessary for producing 100 parts of a plasticised product consisting of plasticiser and polyvinylbutyral, and the solution is employed to plasticise polyvinylbutyral. The further working up of the plasticised product takes place as in Example 1. Figure 1 is a flow diagram corresponding to this example.

I claim:

1. A process for the production of an extruded polyvinylbutyral foil for use in the manufacture of safety glass, comprising the steps of adding to the polyvinylbutyral material before extrusion a liquid in an amount of from three to fifteen percent by weight of the polyvinylbutyral, said liquid having a boiling point which is below the temperature at which the polyvinylbutyral material is extruded, and thereafter extruding said material to produce a foil having a roughened surface.

2. A process for the production of an extruded polyvinylbutyral foil for use in the manufacture of safety glass, comprising the steps of adding to the polyvinylbutyral material before extrusion a liquid selected from the group consisting of water, ethylpropionate and iso-octane, in an amount of from 3 to 15% by weight of the polyvinylbutyral material, and thereafter extruding said material at a temperature above the boiling point of said liquid to produce a foil having a roughened surface.

3. A process for the production of an extruded polyvinylbutyral foil for use in the manufacture of safety glass, comprising the steps of adding a liquid, in an amount of from 3 to 15% by weight of polyvinylbutyral to be employed, to a plasticiser for the polyvinylbutyral, said liquid having a boiling point which is below the temperature at which the plasticised polyvinylbutyral material is extruded, adding the resulting liquid and plasticiser mixture to the polyvinylbutyral, and thereafter extruding the plasticised polyvinylbutyral material to produce a foil having a roughened surface.

4. A process for the production of an extruded polyvinylbutyral foil for use in the manufacture of safety glass, comprising the steps of adding to the polyvinylbutyral a liquid in an amount of from 3 to 15% by weight of the polyvinylbutyral, said liquid having a boiling point which is below the temperature at which the plasticised polyvinylbutyral material is extruded, adding a plasticiser to the resulting liquid and polyvinylbutyral mixture, and thereafter extruding the plasticised polyvinylbutyral material to produce a foil having a roughened surface.

References Cited in the file of this patent

UNITED STATES PATENTS

| | | |
|---|---|---|
| 2,120,935 | Groff | June 14, 1938 |
| 2,528,200 | Weinberg | Oct. 31, 1950 |